United States Patent [19]

Buller-Colthurst

[11] Patent Number: 4,610,886
[45] Date of Patent: Sep. 9, 1986

[54] MULTI-CONVEYOR PROCESSING SYSTEM

[75] Inventor: Guy E. Buller-Colthurst, Erin, Canada

[73] Assignee: Knud Simonsen Industries Limited, Rexdale, Canada

[21] Appl. No.: 618,424

[22] Filed: Jun. 7, 1984

[51] Int. Cl.⁴ .................. G01N 33/02; A23B 4/04; B65G 23/38
[52] U.S. Cl. ................................ 426/233; 34/216; 99/468; 99/474; 99/477; 99/443 C; 198/575; 198/859; 426/315; 426/523
[58] Field of Search .............. 426/315, 523, 233; 99/468, 470, 474, 477, 404, 386, 443 C; 17/44.4; 137/563; 198/570, 575, 859; 34/216, 217

[56] References Cited

U.S. PATENT DOCUMENTS

| 1,581,519 | 4/1926 | Robertson | 426/315 |
| 3,744,617 | 7/1973 | Herbener | 198/859 |
| 3,792,508 | 2/1974 | Simonsen et al. | 17/44.4 |
| 3,982,300 | 9/1976 | Soikie et al. | 17/44.4 |
| 4,250,917 | 2/1981 | Jespersen et al. | 137/563 |
| 4,310,020 | 1/1982 | Jespersen et al. | 137/563 |
| 4,366,177 | 12/1982 | Wells et al. | 426/523 |
| 4,389,562 | 6/1983 | Chaudoir | 34/216 |
| 4,444,094 | 4/1984 | Baker et al. | 99/443 C |

FOREIGN PATENT DOCUMENTS

257355 9/1926 United Kingdom ............ 99/443 C

Primary Examiner—George Yeung
Attorney, Agent, or Firm—George A. Rolston

[57] ABSTRACT

A processing system for batches of different products in the same conditions, and having chamber means having zones, air circulation for each zone, and tempering for tempering the air zones, to produce uniform conditions within each zone, first and second separate side by side conveyors passing through the chamber, batch supports movable on respective first and second conveyors, for carrying batches of compatible products, conveyor movement for moving said separate batch supports at different speeds, and different timings, to procure different transit and dwell times of different products within the same zones of the chamber, and, control means connected to the conveyor.

12 Claims, 4 Drawing Figures

MULTI-CONVEYOR PROCESSING SYSTEM

The invention relates to the simultaneous processing of different products, requiring different processing times, in the same processing facility, and in particular to the processing of meat products such as by smoking, cooking, chilling and the like, and to apparatus for processing such products.

BACKGROUND OF THE INVENTION

Processing of products, typically meat products such as by smoking, cooking, chilling, or the like is commonly carried out by passing such products along a conveyor system through one or more sequential chambers, to achieve the various processing steps, or to progressively achieve the different stages in the desired processing. Different products will require to be processed at different conditions within each chamber or within each stage of the continuous chamber. Products of this type requiring different processing conditions have, of course, of necessity been processed in different batches at different times. The appropriate conditions must be established in each stage of the processing line or chamber as are needed for such products.

Accordingly, it is the general practice to provide such processing lines which are capable of accepting a single type of product at a time. Naturally the quantity of the particular type of product being processed may vary widely, but so long as that one type of product is being processed, no other product requiring different conditions or timing could be passed through the processing facility.

This had the effect of somewhat restricting the flexibility of production. It meant that the processing facilities would have to be operated at conditions which matched either the product for which there was currently the most demand, or alternatively, the product for which the raw materials were currently most readily available or most suitable.

Other types of products would have to be delayed while the one product was being passed through the processing line.

Generally speaking, if it was desired to process more than one type of product simultaneously, then it was considered necessary to erect two separate processing facilities. This of course simply doubled the cost of the initial investment. This increase in investment was not always warranted by market conditions or availability of product and consequently it was not always possible to justify the doubling of the capital investment to achieve the desired flexibility.

An additional disadvantage of the provision of the former type of processing facility was the factor of the physical area, or real estate occupied by the facility. Generally speaking, in order to be operated satisfactorily, the processing chamber was in the form of an elongated oven, which may either be considered as a single continuous chamber, or which may be considered as a series of sequential chambers joined together. A continuous conveyor system such as an overhead conveyor rail ran throughout the chamber, and batches of product were loaded onto the rail at spaced intervals, and moved at a fixed speed.

In the meat processing industry in particular, the products are loaded on product hangers by hand, and the product hangers are then transferred onto the conveyor rails also by manual labour. As a result, there were certain physical limitations on the size of the product hanger and the amount of product that could be hung on any one hanger. This in turn imposed certain dimensional limitations on the interior size of the chamber. Thus the chamber could have no greater width and height dimension than was required to accept the passage of a single manual load of such product. Some attempts to increase the size of the chamber have been proposed such as in U.S. Pat. No. 1,581,519, but have not found wide acceptance.

The result of these various limitations was therefore that in order to achieve a satisfactory processing capacity to meet large scale demands, the processing chambers themselves became of very considerable length. Since the processing chambers were located all on a common level, the end result was that the processing chamber occupied a very considerable amount of space which added considerably to the overall capital cost of the installation. An additional factor in the design and disadvantages of the commonly accepted form of processing facility was that in such processing chambers it is required to provide a highly efficient form of air circulation, so as to achieve overall uniform conditions at each stage throughout the chamber. This was essential in order to provide uniform product appearance and condition, after passage through the processing stages.

It was also necessary that such conditions should be capable of being controlled very narrowly, to close tolerances.

In order to achieve this, in the usual elongated processing chambers, they are provided with a relatively complex system of ducts, circulating fans, and temperature and humidity sensors, and temperature and humidity regulators and the like.

The provision of all these facilities along the full length of a very considerably elongated tunnel-like structure presents considerable engineering problems, and requires the inclusion of a large number of sensors and controls in order to maintain uniformity at the various stages.

Clearly, considerable economies can be achieved by making the interior dimensions of the chambers or ovens larger, and processing the meat products through the larger chambers in larger batches. At the same time, the speed of movement of the conveyor through such chamber would be reduced so that the end result would achieve essentially the same dwell time in the desired processing conditions at each stage throughout the chamber.

It will of course still be necessary to provide for highly efficient air circulation throughout the entire interior area of each of the zones, but provided suitable attention is paid to this aspect of the design construction, this can now be achieved. For example, there is disclosed in U.S. Pat. No. 4,250,917 and 4,310,020, and also in pending U.S. patent application Ser. No. 188,167, all of which have been assigned to the applicant of this application, various inventive aspects in the design of a batch processing chamber for processing meat products in batches. A highly efficient form of air circulation is achieved, which may be effected either from one side to the other, or from the sides to the center of the chamber or from the center to the sides, in a sequentially reversing manner, thereby providing for effectively uniform processing conditions throughout the entire cross-sectional area of a large chamber, resulting in the uniform processing of very large volumes of product.

In these batch chambers, a cage-like frame carrying a large volume of product is moved into the chamber, and the product is processed while standing still in the chamber.

By the application of these inventions uniform processing conditions can be maintained throughout the full extent of the cross section of the chamber while very large volumes of product are processed.

The supporting of such large batches of product may be achieved in various ways. For example, product such as weiners may be supported on meat product supports such as are shown in U.S. Pat. Nos. 3,594,858, 3,732,971, 3,792,508, and 3,982,300, all of which have been assigned to the applicant of this application. A skin of sausages from a sausage stuffing machine is loaded onto one of such hangers by hand. Such hangers can be used on a much larger form of support or "cage" in which a larger number, for example, four, six, eight or more such hangers each loaded with weiners may be suspended, and the cage when loaded may then simply be moved into the chamber, for example, on a fork-lift truck.

However, such a facility will only provide for the processing of a single type of meat product at any one time.

As stated, this is found to be unduly restrictive on the flexibility of manufacture.

Various different forms of meat products such as polish sausage and bologna, may be processed in conditions which are virtually identical to the processing of, for example, weiners, but will require to be handled and suspended in different ways from that used in connection with weiners.

Other meat products such as ham and other meats may be processed in different ways for different markets, for example some by smoking, others by cooking, and others by both smoking and cooking.

The processing times or dwell times, as they are known, in the processing chambers will vary depending upon the type of product, notwithstanding that the actual processing conditions, i.e. temperature, humidity and the like are identical. However, when using the usual type of batch chamber it is not normally possible to process such different types of meat products in the same chamber under the same conditions, and provide for different processing times.

For all of these reasons therefore, it is clearly desirable to provide for a continuous processing facility which offers solutions to all of these problems. In particular, such a facility should provide:

1. Capability of simultaneously processing more than one type of product under the same processing conditions, but for different dwell times.

2. A more economical use of space, brought about by a reduction in the length of the facility, and an increase in the interior cross-sectional dimensions, as compared with known continuous processing systems.

3. An improvement in the equipment for circulating air, and maintaining processing conditions, without increasing the complexity or cost of the equipment, and preferably reducing such costs.

4. Capability of supporting different, but compatible, products, in different batches, in the same chamber or zone.

5. Capability of moving loads of product along separate conveyor paths, at different rates, and in a step-wise manner, so that different dwell times can be established in different zones of the chamber, for different loads.

BRIEF SUMMARY OF THE INVENTION

The invention seeks to overcome the foregoing disadvantages by the provision of a processing system comprising, processing chamber means of predetermined width and height, and of predetermined length, and defining at least two sequential processing zones, wherein different processes may be carried out, at least two side by side conveyor means extending through such chamber means, means for supporting separate batches of different products side by side on separate conveyor means in such chamber means, and conveyor operating means for operating one of said conveyor means at a different speed from the other, whereby such separate loads of different products may be moved through the same chambers at different speeds, thereby providing for different dwell times for such different separate loads of such different products within the same zones of such chamber, air circulation means for said zones of said chamber means, and separate conditioning means for each of said zones whereby the conditions within said zones may be regulated independently of one another, and, control means for regulating the transport of such separate batches of different products on said separate conveyor means, for regulating the dwell times of such separate loads of different products within the same said zones independently of one another.

More specifically, the invention seeks to provide a processing system having the foregoing advantages in which the system is specifically designed for the processing of meat products, wherein the processing system provides for the processing, for example smoking and/or cooking of such products followed by a chilling stage.

More particularly, the invention seeks to provide a processing system having the foregoing advantages wherein the conveyor operating means comprises stepwise power operated devices for each said conveyor means, whereby loads of product on one conveyor means may be moved along said one conveyor means separately from loads on the other conveyor means, and such movement is at predetermined different times.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF A SPECIFIC EMBODIMENT

Figure 1:
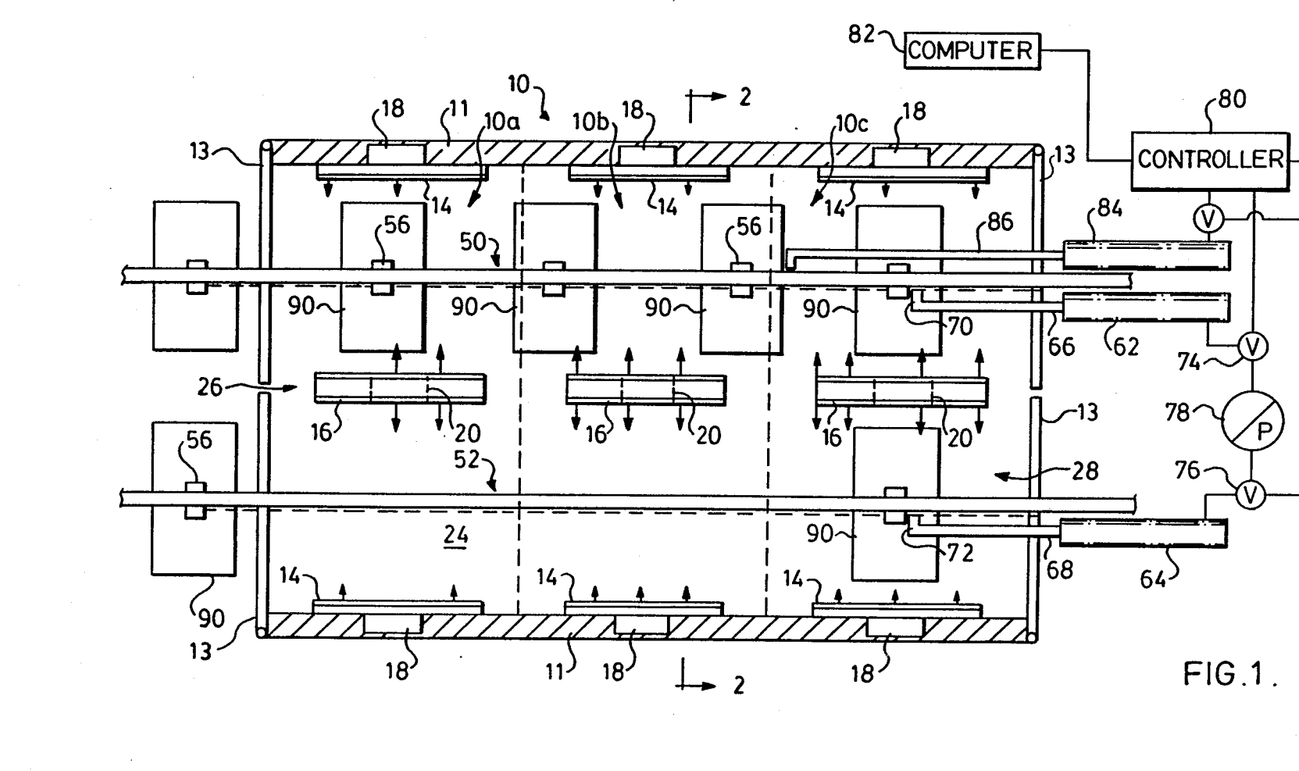
FIG. 1 is a schematic plan view of the processing system according to the invention.
Figure 2:
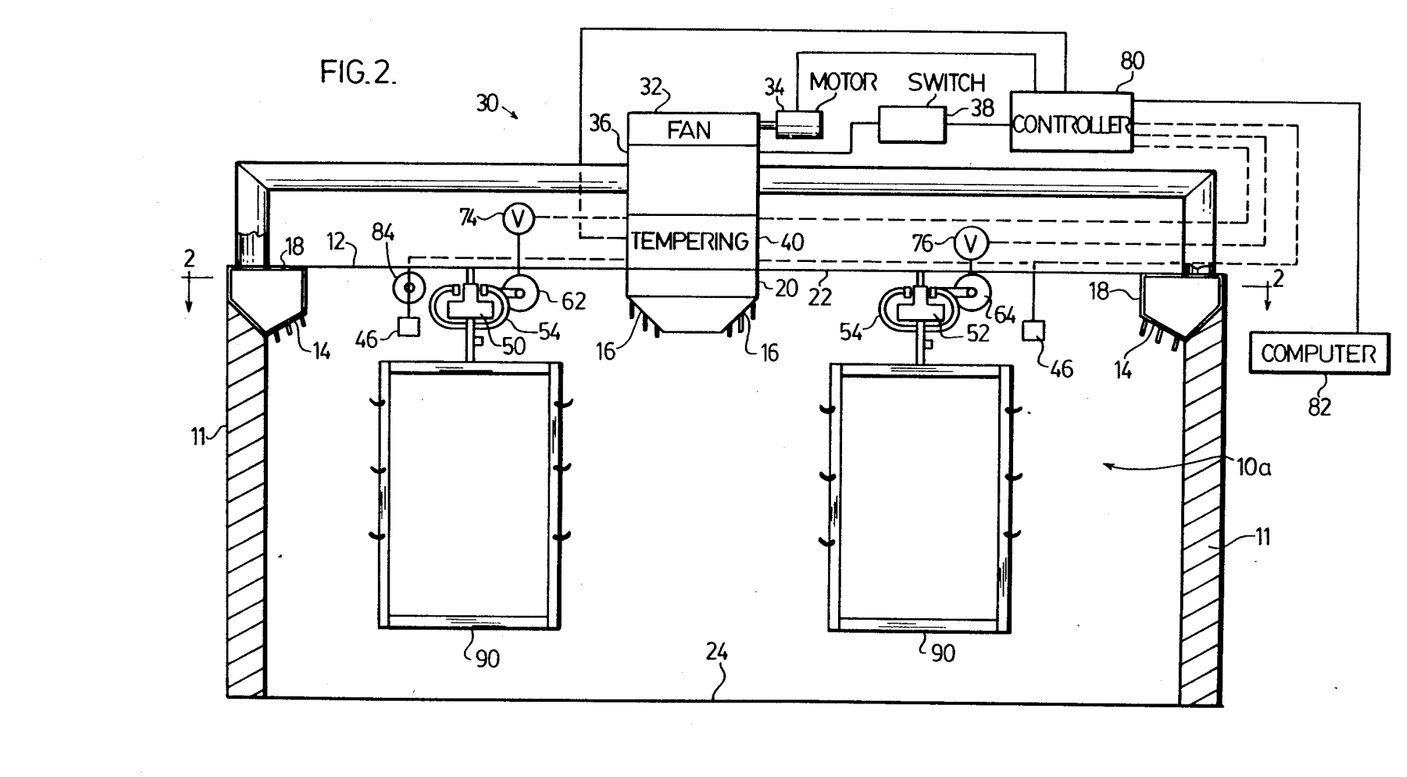
FIG. 2 is a schematic end view of the processing system.

Referring now to FIGS. 1 and 2, the invention will be seen to comprise a processing chamber indicated generally as 10, which for the purposes of the present explanation may be considered as being divided into separate processing zones or stages indicated as 10a, 10b and 10c.

It will, of course, be understood that the processing chamber 10 in the majority of cases is an essentially elongated tunnel-like device, having side walls and a top wall, and open at both ends. Suitable movable doors 11 may be provided for closing off the ends.

The division of the interior of such chamber 10 into zones is in the majority of cases simply a notional division for the sake of explanation and understanding. In many cases there will be no sharp division or partition between individual zones, and the division will be essentially defined by reference to the different temperature, humidity, smoke, etc., conditions prevailing as between two adjacent zones.

However, the invention does not exclude the possibility of movable curtain-like devices or partitions (not shown) dividing individual zones so as to maintain a greater degree of control over the conditions in each zone, and in certain circumstances, it may in fact be desirable to incorporate such partitioning means.

In the example shown, there are three such zones. It will, however, be appreciated that there may be two, three or four more such zones as required for the particular process being carried out. In the typical meat processing application, there will usually be three zones, namely, a smoking zone, a cooking zone and a final chilling zone.

In order to provide for uniform conditions in each zone, air circulation means are provided within each zone, which are specifically designed to produce uniform air circulation throughout all areas of the zone from its top to its bottom.

In addition, since some types of products will be packed more closely than others, some degree of interference with the air circulation will occur by reason of the passage of such products through the zone.

In order to as far as possible eliminate variations caused in this way, provision is made for changing the pattern of air flow at predetermined time intervals, so as to as far as possible minimize the effects of air flow interference.

In order to provide for uniform air flow, the chamber 10 may be provided with air flow walls of hollow construction, and may define interior ducts or partial ducts (not shown) and a plurality of air ports on their inner wall faces facing inwardly into the interior of the chamber 10.

Such air flow walls may be manufactured as shown in U.S. patent application Ser. No. 188,167 referred to above.

In this embodiment, however, a simplified air flow system is provided which is satisfactory for many purposes. This simplified system comprises side air flow grilles 12 and central air flow grilles 14. Such grilles 12 and 14 may function as both air delivery or air return grilles, as described below. Such grilles are mounted on plenum boxes or ducts 18, 20 located on the roof of chamber 10 along its central axis, and its sides.

The roof or top of the chamber 10 is represented by the single panel 22, and the floor by the single panel 24. It will, of course, be appreciated that depending upon the design and construction of the chamber such portions of the chamber may be insulated in some way. The interior of the chamber will be preferably formed of stainless steel so as to permit for suitably sanitary processing conditions.

As noted, doors 11 may be provided at the entrance 26 and exit 28 of the chamber 10, in accordance with the designs well-known in the art.

In order to supply air to the various zones, an air flow system indicated generally as 30 is provided, having a fan 32 powered by a motor 34. An air flow regulator 36 is provided connected to the fan 32. The effect of such air flow regulator is to receive air flowing in a uniform manner from the fan 32, and to regulate the proportionate flow to one side, or the other. Air is withdrawn from the central plenum ducts 20.

The regulator is operated at timed intervals by any suitable power operated means such as electrical power, or compressed air or the like by any suitable means (not shown). In any event, such power operated means is controlled by means of the switch 38.

The regulator may also be a reverser as shown in U.S. Pat. Nos. 4,250,917 and 4,310,020 if desired. Thus by simply operating the switch 38 a greater proportion of air can be directed to one of side wall ducts 18, and across the interior of the chamber, and withdrawn through the central plenum 20. Alternatively, a greater proportion can be supplied through the other side duct duct where it will again flow across the chamber, in the opposite direction and is then withdrawn through the centre plenum.

In either case, such air flow circulation is essentially continuous, and will be taking place without substantially venting air to atmosphere or inducting fresh air except as is called for by the process conditions.

In order to supply the necessary atmospheric conditions required for processing within any portion of any of the zones, the zones will each be provided with a separate air circulation system 30. In the smoke zone which would typically be the first zone 10a, such air system 30 will typically incorporate air tempering means such as a smoke generator of any suitable design indicated generally as 40. Alternatively, such smoke generator 40 may be replaced by other tempering means. In zones 10b and 10c the air tempering means 40 may be for example by heating coils, or by chilling coils, or by humidity or dehumidity controllers (not shown).

In any event, the air being circulated in any one of the air circulation systems will be subject to treatment both as to temperature and as to its condition and content. Such air treatment systems are in general referred to as "tempering" as being a generic term applicable to all such treatment or conditioning steps as may be required from time to throughout the zones.

In order to control the "tempering" of such air suitable sensors 46, such as sensors for temperature, humidity and the like are provided. They are connected by automatic means to be described below for continuous monitoring.

In order to carry loads of product through the chamber 10, a plurality of side by side conveyor means are provided. In this case two such conveyor means are shown side by side being indicated as 50, and 52 respectively. It will, however, be appreciated that if desired three or conceivably more such conveyor means might be provided in a much larger installation, if production volumes warranted it.

However, there are certain practical limitations as to the number of different conveyors that may usefully be incorporated in the one chamber.

Thus the conditions and tempering of the air within any of the zones of the chamber will necessarily be the same within each particular zone. It will thus only be possible to process different types of products, within the same conditions, which are what is known as "compatible" products. This means that the products must be such that although such products are different types, i.e. in some cases weiners on the one hand and bologna sausage on the other hand, they can still be processed under the same ambient conditions and tempering. However they will require different dwell times within the individual zones to produce the desired processing result.

Other forms of meat products such as hams, picnics and the like, and sides of bacon, will not be compatible with such sausage products, in the majority of cases, but could be processed simultaneously side by side in the same chamber at appropriate tempering conditions.

Thus, unless a particular processor is faced with a situation where he wishes to process either very large volumes of the same product, on side by side conveyors, or alternatively requires to process three or more different products all of which are "compatible" within the meaning of this definition, it would not be useful to provide three such conveyors going through a chamber having zones wherein the conditions were uniform across each zone.

Each conveyor means 50 and 52 in this embodiment will be seen to comprise rails which are adapted to carry a plurality of movable carriers, known as trollies 54. These may be independent, or may be connectable by means of, for example, a linked chain or the like (not shown). Trollies 54 may be slid onto the rail at one end, and removed at the other after transit through the zones.

Any suitable movement means may be provided which may provide for either continuous movement at a predetermined speed or alternatively may provide for step-wise movement.

Figure 3:
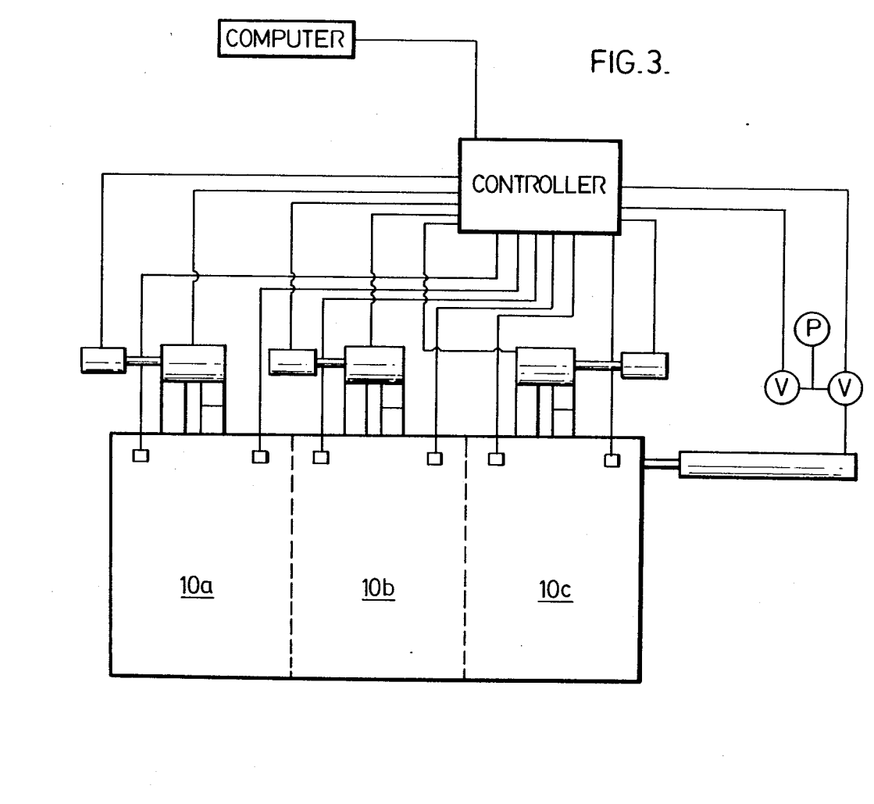
FIG. 3 is a schematic side elevational view of a portion of the conveyor system and power operated transport mechanism, and showing a schematic block circuit diagram of the controller.

In the particular form shown a step-wise movement means is provided in the form of compressed air cylinders 62 and 64, having respective piston rods 66 and 68, provided with hook means 70 and 72. The hook means 70 and 72 are provided with a releasable escapement or tooth device (not shown) such as is well known in the art, for engaging links of the chain (not shown), or suitable portions of one of the trolleys 54. One stroke of cylinder 62 or 64 will cause the trolley engaged by it to advance one step, ie the length of such stroke.

It will, however, be appreciated that this is but one form of many different movement devices which may be provided for either continuous or step-wise transmission of product through the chambers.

Cylinders 62 and 64 are separately controllable by means of individual control valves 74 and 76, supplied from typically common compressed air source 78. Valves 74 and 76 are individually controlled by means of a central controller 80.

Controller 80 is also in this embodiment connected to switch 38, controlling the air flow reverser 36.

Preferably, such controller 80 will be connected to the air tempering device 40, 42, 44 in each zone, which may, as noted above, be either smoke, heat or may be chilling or humidifying or dehumidifying the atmosphere within any one of the zones.

Preferably also, the sensors 46 in each zone 10, 10b and 10c of the chamber will also be connected to the controller 80, so that the controller 80 can continuously monitor conditions within the zone and can regulate them accordingly.

It will also be appreciated that in certain cases the physical nature or content of the product being supplied at the input end of the chamber 10 may vary. One common variable in meat products is the fat content of the meat, but there may be other variables in other forms of meat or other products.

The processing conditions may from time to time have to be adjusted accordingly.

Preferably, a product information computer 82 will therefore be provided for supplying information about the product to the controller 80. In this way, the supervisor of the line may vary or adjust the conditions from zone to zone along the length of the line, as the physical content of the product varies.

In some cases, one type of product on one of rails 50 or 52 will not require processing in, for example, the third zone 10a. In this case it must be moved through that zone without stopping.

For this purpose an override cylinder 84, having a rod and hook 86 is provided. It is controlled by valve 88. It is capable of reaching further into the zones and pulling the endmost batch of product through the zone without stopping.

The product itself, which in this case are meat products would be supported on suitable product-supporting sticks or devices. A cage device indicated generally as 90 carries such sticks of product and represents the "batch" of product, referred to above.

Cages 90 in this embodiment are releasably connected to respective trollies 54. Trollies 54 support the cages 90 from the rail 50 or 52, for passage through the zones.

The trollies may be releasably connected to a continuous conveyor such as a chain (not shown) or the cages may be releasably connected to each other, for movement through the zones.

Where weiners are to be supported, then the aforementioned product supports will be particularly suitable. On the other hand, where other forms of sausage products are to be processed, or where the processing is carried out using hams or picnics or sides of bacon, then other forms of supporting devices will be suitable. One well-known form of suitable product support is the so-called smokehouse stick, which is a wooden or metallic rod, of adequate strength to support a quantity of product which is simply loaded manually and hooked in place on the cage 90. Cage 90 is then moved by any suitable power-operated lifting or hoisting mechanism. Such a mechanism may be specially constructed for the purposes of the invention. Alternatively, it can simply be a fork-lift truck of well-known design.

It will thus be seen that the product may be loaded onto cages 90 of virtually any size desired within reason, so that the cage 90 can be constructed so as to fill the cross-sectional area of the chamber lying beneath the particular conveyor 50 on which it will be supported.

In the example shown, a fairly substantial free air space is shown around the cages 90, for the sake of simplicity in explanation. It will, however, be appreciated that in most of such installations the free air space will be as far as possible minimized to the extent compatible with providing for free unrestricted circulation of air within the chamber.

Clearly, if there is no free space at all between the walls 12 and the cages 90, then air circulation may be to some extent restricted. On the other hand, if excessive free air space is provided, then the air handling facilities will become unnecessarily large, leading to increased capital costs and operating costs without any additional benefit.

The connection of the various controls and operating devices and sensors is best understood with reference to FIG. 3, and the operation of the invention will be self-evident from the illustrations and the description.

Manual operators will load product onto hangers which are then manually placed in position on the cages 90. The cages 90 are then hooked onto rails 50, 52 and then begin movement into the input end of the chamber 10 and thus enter the first zone 10.

If the operator is just starting up operation, then then product information will have been input through the computer 82 into the controller 80, so that the necessary conditions are already established within zone 10a at the time the product first enters.

Product may be loaded onto the one conveyor rail, and processing may be established at predetermined conditions and for predetermined dwell times within the various zones 10a, 10b and 10c.

A second product may be loaded on another of cages 90, and may be loaded on the other conveyor rail, provided it is "compatible" with the first product. By means of the computer 82, different transit and dwell times may be provided for the second product on the second conveyor.

The controller 80 will thus control the conditions within the zones, and will also control the separate movement means 62 and 64, so that the transit and dwell times of the cages of product within the zones will vary on the two separate conveyors notwithstanding that the condition within any one zone is uniform throughout.

Figure 4:
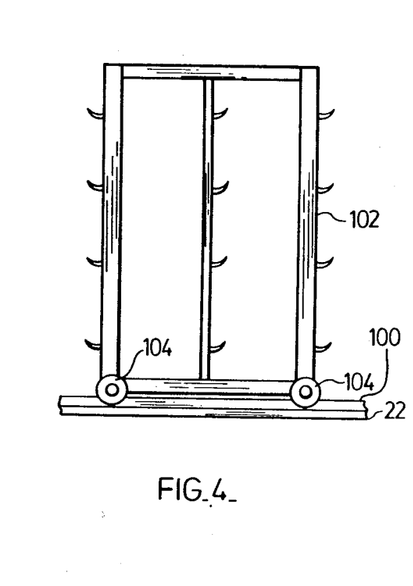
FIG. 4 is a schematic side elevation showing another type of conveyor, and support mechanism.

Another form of conveyor is shown in FIG. 4. In this embodiment rails or guides 100 can be laid in the floor.

The cages 102 may have wheels 104. Movement can be controlled by any suitable mechanism which may either push or pull the cages 102 along the rails.

In order to introduce cages of product into the entrance of the chamber, additional product input cylinders (not shown) may be provided, for pushing loaded cages into the chamber at upstream end.

The override cylinders 84, the downstream end can also be used for extracting fully processed cages.

In addition, it will be appreciated that where doors are provided at the upstream and downstream ends of the ovens, the operation of these doors will also be controlled automatically by the controller, and a suitable door opening and closing mechanism which may also be provided by means of operating cylinders or the likes such as is well known in the art.

It will thus be seen that by the practice of the invention weiners can be processed on one side of the chamber, whereas bologna sausage can be processed on the other side of the chamber, these two products being generally speaking compatible, and normally being processed under identical processing conditions. However different dwell times can be provided, to provide for cooking of the smaller or larger sausage products.

Similarly, where different types of hams are to be processed, they would normally be required to be con- ditions, but different dwell times might be applicable depending upon the weight of the hams. Thus, small hams or picnics could be processed on one side, and larger hams on the other side.

The processing of bacon, or pork bellies, can also be carried out advantageously in accordance with the invention by processing, for example, smaller products on one side and larger products on the other.

It will thus be seen that a much greater degree of flexibility can be achieved by means of the invention, so that advantage can be taken of the availability of raw materials of different types or at least of different sizes and weights, and the need for storing large quantities of unprocessed raw material prior to processing, can be avoided. Similarly, the delays in marketing product, where orders cannot be shipped, due to the use of processing facilities for some other type of product, for example, is also greatly reduced.

At the same time, the physical amount of real estate required for the installation of the invention is greatly reduced, and the complexity of controls required for controlling the tempering conditions in the various zones is also substantially reduced.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A processing system for the processing of separate batches of meat products in the same processing conditions, such batches being processed for predetermined transit and dwell times, said system comprising:
    chamber means defining a plurality of processing zones through which said batches of products are transported;
    air circulation means for each one of said zones, and tempering means for tempering the air in said zones, whereby to procure uniform processing conditions within each of said zones, to provide for uniform processing conditions for all batches of products passing through each one of said zones;
    first and second separate side by side conveyor means passing through each one of said zones of said chamber means, along which said batches of products are transported side by side;
    support means moveable on respective first and second conveyor means, for carrying one of said batches of products on said first conveyor means and another of said batches of products on the second said conveyor means;
    first step-wise movement means selectively operable at predetermined time intervals for moving one of said support means with one of said batches of products on said first conveyor means operable to cause step-wise movement, and stopping, of said one support means whereby to procure dwells of said one of said batches of products in each one of said zones for predetermined dwell times, for processing under predetermined conditions in each one of said zones;
    second step-wise movement means selectively operable at predetermined time intervals for moving another of said support means with another of said batches of products on said second conveyor means, operable to cause step-wise movement, and stopping, of said another of said support means, whereby to procure dwells of said another of said batches of products in each one of said zones for processing therein under conditions identical to those for said one of said batches of products for predetermined dwell times, and,
    control means connected to said first and second movement means, and operable to procure separate automatic timed operation thereof whereby said first movement means is operated to move and to stop in a first timed sequence to procure movement and stopping of each of said batches of products on said first conveyor means, and dwelling thereof in each of said zones for a series of predetermined first time limits, and whereby said second movement means is operated to move and stop in timed sequence to procure movement and stopping of each of said batch of product on said second conveyor means and dwelling thereof in each of said zones for a series of predetermined second time limits, different from said first time limits.

2. A processing system as claimed in claim 1 including a side duct means along each side of said chamber means, and center duct means along a central region thereof, and air circulation means for circulating air between said side ducts and said center duct.

3. A processing system as claimed in claim 2 including air regulator means for regulating the proportionate flow of such air between said side ducts and said center duct.

4. A processing system as claimed in claim 1 including condition sensing means at spaced intervals along said chamber means, and connected to said control means, whereby to regulate the dwell time of said batches of products and the movement of said movement means.

5. A processing system as claimed in claim 1 including door means at the upstream and downstream ends of said chamber means, and automatic opening and closing means associated therewith, said automatic and closing means being connected to said control means and operated in time relation thereby.

6. A processing system as claimed in claim 1 including information input means connected to said control means, whereby information relating to said batches of products is stored for regulating the operation of said movement means.

7. A processing system as claimed in claim 1 wherein said movement means comprises a plurality of cylinders, and operating rods extending from said cylinders, and adapted to extend into said chamber means, and having means for engaging said support means and moving the same through said chamber means at time intervals.

8. A method of processing first and second meat products under identical process conditions, said first and second meat products being suitable for processing under the same conditions, one of said first and second products being processed at different timings than the other of said first and second products, and comprising:
assembling batches of said first product and batches of said second product on separate batch support means;
introducing a batch of said first product into a processing chamber defining at least two sequential zones, along a first conveyor path passing through said zones;
introducing a batch of said second product into the same said processing chamber along a second conveyor path parallel to and spaced from said first conveyor path, and passing the same through each of said zones of said chamber;
circulating air and tempering the same in a first one of said zones thereby establishing a first processing condition in said first zone;
circulating air and tempering the same in a second one of said zones thereby establishing a second processing condition in said second zone;
moving said batch of said first product in steps through said zones of said chamber and stopping same for processing at predetermined time intervals, whereby to procure first predetermined dwell times of said batch of said first product in each of said zones, and,
moving said batch of second product in steps through each of said zones and stopping same for processing under conditions identical to said batch of said first product at a pre-determined second series of timed intervals whereby to procure second dwell times in each of said zones different from said first dwell times of said batch of said first product.

9. A method as claimed in claim 8 including the step of moving said batch of said second product through one of said zones in a single step whereby to prevent said batch of said second product from dwelling in said one of said zones, while a said batch of said first product remains stopped in the same said zone.

10. A processing system as claimed in claim 1 including third movement means in one of said zones operable to move a said batch of product through said one of said zones in a single step whereby to prevent said batch from dwelling in said one of said zones.

11. A processing system for the processing of separate first and second batches of products in the same processing conditions, such batches being processed for predetermined first and second transit and dwell times, said system comprising:
chamber means defining a plurality of processing zones through which all said batches of products are transported;
air circulation means for each one of said zones, and tempering means for tempering the air in said zones, whereby to procure uniform processing conditions within each one of said zones, for all batches of products in each one of said zones;
first and second separate side by side conveyor means passing through all said zones of said chamber means, along which said batches of first and second products are transported side by side;
support means movable on respective first and second conveyor means, for carrying said batches of said first products on said first conveyor means and said batches of said second products on said second said conveyor means;
first step-wise movement means selectively operable at predetermined time intervals for moving and stopping said support means on said first conveyor means whereby to procure dwells of said batches of said first products in each one of said zones for predetermined first dwell times;
second step-wise movement means selectively operable at predetermined time intervals for moving and stopping said support means on said second conveyor means, whereby to procure dwells of said batches of said second products in each one of said zones for predetermined second dwell times, and,
control means connected to said first and second movement means, and operable to procure separate automatic timed operation thereof whereby said first movement means is operated to move and to stop in timed sequence to procure movement and stopping of each of said batches of said first product on said first conveyor means, and dwelling thereof in each one of said zones for predetermined first dwell times and whereby said second movement means is operated to move and stop in timed sequence to procure movement and stopping of each of said batches of said second product on said second conveyor means and dwelling thereof in each one of said zones for a predetermined second dwell times, different from said first dwell times, thereby subjecting said first and second products to processing conditions, identical for each, but for different time limits.

12. A method of processing first and second products under identical processing conditions, said first and second products being suitable for processing under the same conditions, one of said first and second products being processed at different timings than the other of said first and second products, and comprising:
- assembling batches of said first product on one batch support means and batches of said second products on other batch support means;
- introducing a batch of said first product into a processing chamber defining at least two sequential processing zones along a predetermined conveyor path passing through said processing zones;
- introducing a batch of said second product into the same said processing chamber along a conveyor path parallel to and spaced from said first mentioned conveyor path, and passing through each of said zones of said chamber;
- circulating air and tempering the same in a first one of said zones thereby establishing a first uniform processing condition in said first zone;
- circulating air and tempering the same in a second one of said zones therbby establishing a second uniform processing condition in said second zone;
- moving and stopping said batch of said first product in steps through each of said zones of said chamber at predetermined first time intervals, whereby to procure predetermined first dwell times in each of said zones, and,
- moving and stopping said batch of said second product in steps through each of said zones at a predetermined second series of timed intervals different from said first intervals whereby to procure second dwell times in each of said zones different from said first dwell times of said batch of said first product.

* * * * *